(12) United States Patent
Ruckart et al.

(10) Patent No.: US 7,120,237 B1
(45) Date of Patent: Oct. 10, 2006

(54) SYSTEMS AND METHODS FOR COLLECT CALL PROCESSING

(75) Inventors: John P. Ruckart, Atlanta, GA (US); Rimas J. Rauba, Roswell, GA (US)

(73) Assignee: BellSouth Intellectual Property Corp., Wilmington, DE (US)

(*) Notice: Subject to any disclaimer, the term of this patent is extended or adjusted under 35 U.S.C. 154(b) by 536 days.

(21) Appl. No.: 10/159,882

(22) Filed: May 30, 2002

(51) Int. Cl.
*H04M 3/42* (2006.01)
*H04M 15/00* (2006.01)
*H04M 17/00* (2006.01)

(52) U.S. Cl. ............ 379/201.01; 379/114.15; 379/114.21; 379/114.28; 379/144.02; 379/144.08

(58) Field of Classification Search ........... 379/201.01, 379/144.02, 114.21, 114.15, 114.19, 114.2, 379/114.22–114.26, 114.28, 114.29, 144.01, 379/144.05–144.08, 201.02, 201.04
See application file for complete search history.

(56) References Cited

U.S. PATENT DOCUMENTS

| | | | |
|---|---|---|---|
| 4,797,910 A | 1/1989 | Daudelin | |
| 4,933,966 A | 6/1990 | Hird et al. | |
| 5,043,983 A | 8/1991 | Dorst et al. | |
| 5,287,403 A | 2/1994 | Atkins et al. | |
| 5,438,568 A | 8/1995 | Weisser, Jr. | |
| 5,719,927 A | 2/1998 | Hariu et al. | |
| 5,787,150 A | 7/1998 | Reiman et al. | |
| 5,859,897 A | 1/1999 | Furman et al. | |
| 5,859,902 A | 1/1999 | Freedman | |
| 5,903,636 A | 5/1999 | Malik | |
| 6,363,411 B1* | 3/2002 | Dugan et al. | 709/202 |
| 6,639,978 B1* | 10/2003 | Draizin et al. | 379/114.21 |
| 6,836,540 B1* | 12/2004 | Falcone et al. | 379/127.02 |

OTHER PUBLICATIONS

Rohde, "Court Upholds FCC Detariffing Order," Network World, May 1, 2000.
Crowe, "Detariffing: The Transition Begins," Business Communications Review, Aug. 2000, pp. 8-30.
"Detariffing FAQ," printed from http://www.detariff.com on Apr. 12, 2002.

* cited by examiner

*Primary Examiner*—Harry S. Hong
(74) *Attorney, Agent, or Firm*—Withers & Keys, LLC

(57) ABSTRACT

A method of processing a collect call. The method includes receiving a request for a collect call from a calling party and transmitting information required pursuant to a detariffing order to a called party.

28 Claims, 4 Drawing Sheets

SYSTEMS AND METHODS FOR COLLECT CALL PROCESSING

BACKGROUND

In the past, telecommunications companies that offered, for example, long distance telephone service had to file a document called a tariff with the Federal Communications Commission ("FCC"). The tariff document described the rates, terms, and conditions of service associated with various services. Thus, rates, terms, and conditions of service were not conveyed to individual consumers because the tariff document was available for perusal by consumers. Recently, the FCC has "detariffed" certain telecommunications services and thus, telecommunications companies are not required to file tariff documents with the FCC in some cases. Instead, long distance companies must post rates, terms, and conditions of service on an Internet web page and at a specific place of business.

Prior to detariffing, a tariff document took precedence over any private contract. Thus, in essence, the tariff document was a contract between the telecommunications company and its consumers. After detariffing, telecommunications companies can enter into contracts with consumers without regard to a superseding tariff document.

Detariffing presents a potential problem with respect to telecommunications services in which the charges for the services are paid by a party that receives, rather than places, a call. For example, the party receiving a collect call pays the charges associated with the call. Typically, the party that places such a call utilizes a local exchange carrier, a calling card company, or a long distance telephone company with which the party has a relationship. However, the party receiving the call may have no relationship with the company that is utilized by the party placing the call. Thus, because there is no governing tariff document, the party receiving the call may not be aware of the rates, terms, and conditions of service associated with the call. Also, the company that is utilized by the party placing the call may have difficulty trying to collect the charges associated with the call from the party receiving the call because, arguably, the receiving party may assert that no contract was formed between the company and the receiving party.

U.S. Pat. No. 5,859,902 discloses a method for processing collect calls in which the party receiving a collect call is given information about the cost of the call.

SUMMARY

In one embodiment, the present invention is directed to a method of processing a collect call. The method includes receiving a request for a collect call from a calling party and transmitting at least one of a term of service and a condition of service to a called party.

In one embodiment, the present invention is directed to a method of processing a collect call. The method includes receiving a request for a collect call from a calling party and transmitting information required pursuant to a detariffing order to a called party.

In one embodiment, the present invention is directed to a method of processing a collect call. The method includes receiving a request for a collect call from a calling party and transmitting, by a telecommunications entity, information to a called party. The method also includes receiving an acceptance of an adequacy of the information from the called party, wherein the acceptance creates a contractual relationship between the called party and the telecommunications entity.

In one embodiment, the present invention is directed to a telecommunications switch that is configured to process a collect call placed by a calling party to a called party. The switch includes a switch fabric and a processor. The switch also includes a voice response unit in communication with the switch fabric and the processor, wherein the processor and the voice response unit are configured to provide information required pursuant to a detariffing order to the called party.

In one embodiment, the present invention is directed to an advanced intelligent network configured to process a collect call placed by a calling party to a called party. The advanced intelligent network includes a switch and a service control point in communication with the switch. The advanced intelligent network also includes a services node in communication with the switch, wherein the service control point and the services node are configured to provide information required pursuant to a detariffing order to the called party.

In one embodiment, the present invention is directed to a calling card platform configured to process a collect call placed by a calling party to a called party. The calling card platform includes a switch and a voice response unit in communication with the switch. The calling card platform also includes a processor in communication with the switch, wherein the voice response unit and the processor are configured to provide information required pursuant to a detariffing order to the called party.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

The terms "calling party" and "user" are used herein generally to refer to the person or unit that initiates a telecommunication. In some cases, the calling party may not be a person, but may be a device such as a facsimile machine, an answering service, a modem, etc. The term "called party" is used herein generally to refer to the person or unit that answers or responds to the call or communication. The term "communication" is used herein to include all messages or calls that may be exchanged between a calling party and a called party, including voice, data, facsimile and video messages. The term "communication" is used synonymously herein with the term "call" unless a distinction is noted. The term "subscriber" is used herein to generally refer to a subscriber of the described telecommunications service.

The present invention, in various embodiments, relates to systems and methods for processing collect calls. When a collect call is placed by a calling party, the called party is given information such as, for example, rates, terms, and conditions of service associated with the call. The called party may be given, for example, such information as it appears on an Internet web site as required by a detariffing order of the Federal Communications Commission.

Figure 1:
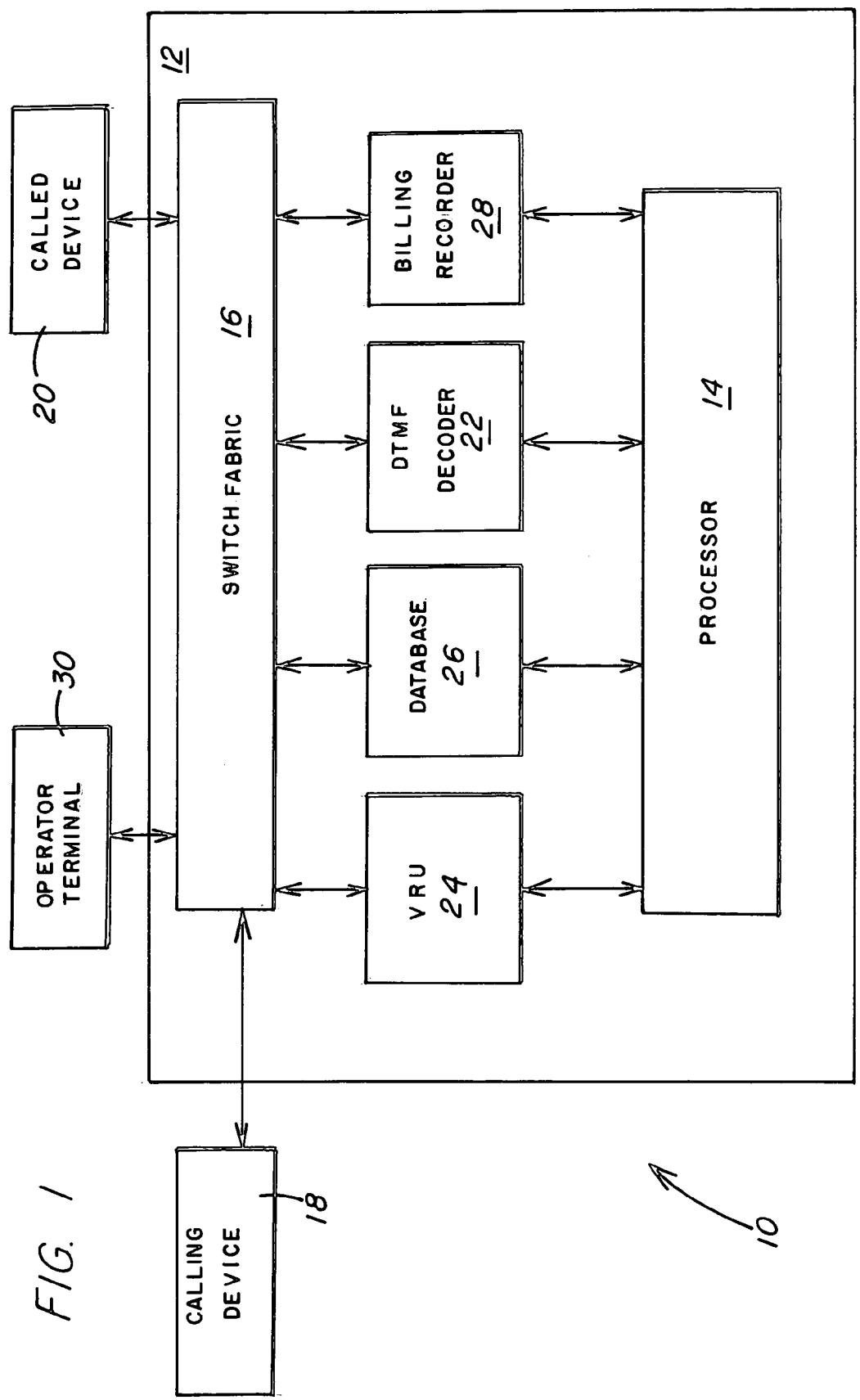
FIG. 1 is a diagram illustrating a portion of a telecommunications system, including a telecommunications switch, according to one embodiment of the present invention.

FIG. 1 is a diagram illustrating a portion 10 of a telecommunications system, including a telecommunications switch 12, according to one embodiment of the present invention. The switch 12 may be any type of switch located in, for example, a local exchange carrier (LEC), a competitive local exchange carrier (CLEC), or an interexchange carrier (ICX).

The switch 12 includes a processor 14 that controls the various portions of the switch 12. Switch fabric 16 switches voice and/or data between, for example, a calling telecommunications device 18 and a called telecommunications device 20. The devices 18, 20 may be, for example, telephones or personal computing devices. The devices 18, 20 may be in communication with the switch 12 via, for example, conventional twisted pair loop circuits connected between the switch 12 and the telephone drops for the customer premises, or via, for example, T-1 trunk circuits. A dual tone multiple frequency (DTMF) decoder 22 receives tones from the devices 18, 20 that are input on the devices using, for example, a touch-tone keypad.

A voice response unit (VRU) 24 receives voice signals from the devices 18, 20 and can analyze and record such voice signals. The VRU 24 may also have the capability to play pre-recorded messages to the devices 18, 20. For example, the VRU 24 may receive spoken input from the device 18 in response to, for example, a menu that is presented to the device 18 at the initiation of a collect call. The VRU 24 may also provide for the calling party to speak a name that is to be recorded and subsequently announced to the called party. The VRU 24 may also provide an audio introduction and other information to the called party that is using the device 20 at the onset of a collect call connection between the devices 18, 20. The audio introduction may include, for example, the cost of the call, the terms of the call, and the conditions of service and may also ask the called party to signify assent to the cost, terms, and conditions and, thus, assent to connection of the devices 18, 20. The VRU 24 may also provide audio messages to the calling party using the device 18 while the device 20 is being provided with the aforementioned information.

A database 26 may store information relating to customers that are subscribers to the services of, for example, the LEC, CLEC, or ICX to which the switch 12 belongs. The information may include, for example, details relating to the customers including, for example, a customer profile. The database 26 may also store, for example, information that is to be announced to the called party prior to connection of a collect call such as, for example, rates, terms, and conditions of service relating to calls that are initiated by the entity to which the switch 12 belongs. It can be understood that the switch 12 may contain or be in communication with other databases. For example, a database may be provided outside the switch that contains rates, terms, and conditions of service relating to various types of calls. Such a database may be, for example, shared by multiple switches and may be, for example, administered by an entity other than the entity to which the switch 12 belongs.

A billing recorder 28 records information about calls that are switched by the switch 12 such as, for example, the calling party identity, the called party identity, and the duration of the call for subsequent generation of bills relating to calls handled by the switch 12.

An operator terminal 30 is located remote from the switch 12. The terminal 30 is used when operator assistance is required to handle a call. For example, a human operator may handle some or all of the functions, such as providing rates, terms, and conditions of service to the called party during a collect call. It can be understood that the terminal 30 may be connected via, for example, an operator access facility. It can also be understood that more than one terminal 30 may be in communication with the switch 12.

The system 10 of FIG. 1 is illustrated in a somewhat simplified form. For example, the system 10 could include other switches and could include interconnecting networks located between the devices 18, 20 and the switch 12. Such interconnecting networks may be, for example, other portions of the LEC, CLEC, or ICX to which the switch 12 belongs or may be separate networks.

In operation, the switch 12 may be used to process collect calls. A user of the calling device 18 may desire to place a collect call to the called device 20. The user of the calling device 18 may dial, for example, the telephone number associated with the called device 20 preceded by the number "0".

After the user of the calling device 18 dials the number, an announcement is made by the VRU 24 to the calling party to request the calling party to, for example, speak a name that will be announced to the called party. The call is then handled as a conventional collect call except that, if the called party desires to hear rates, terms, or conditions of service of the collect call, the processor 14 retrieves such information from, for example, the database 26 and the same is annunciated to the called party by the VRU 24.

According to one embodiment, the present invention utilizes the intelligent functionality of an Advanced Intelligent Network (AIN). The AIN is a network used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. Before describing details of the system of the present invention, a description of the AIN is provided.

Figure 2:
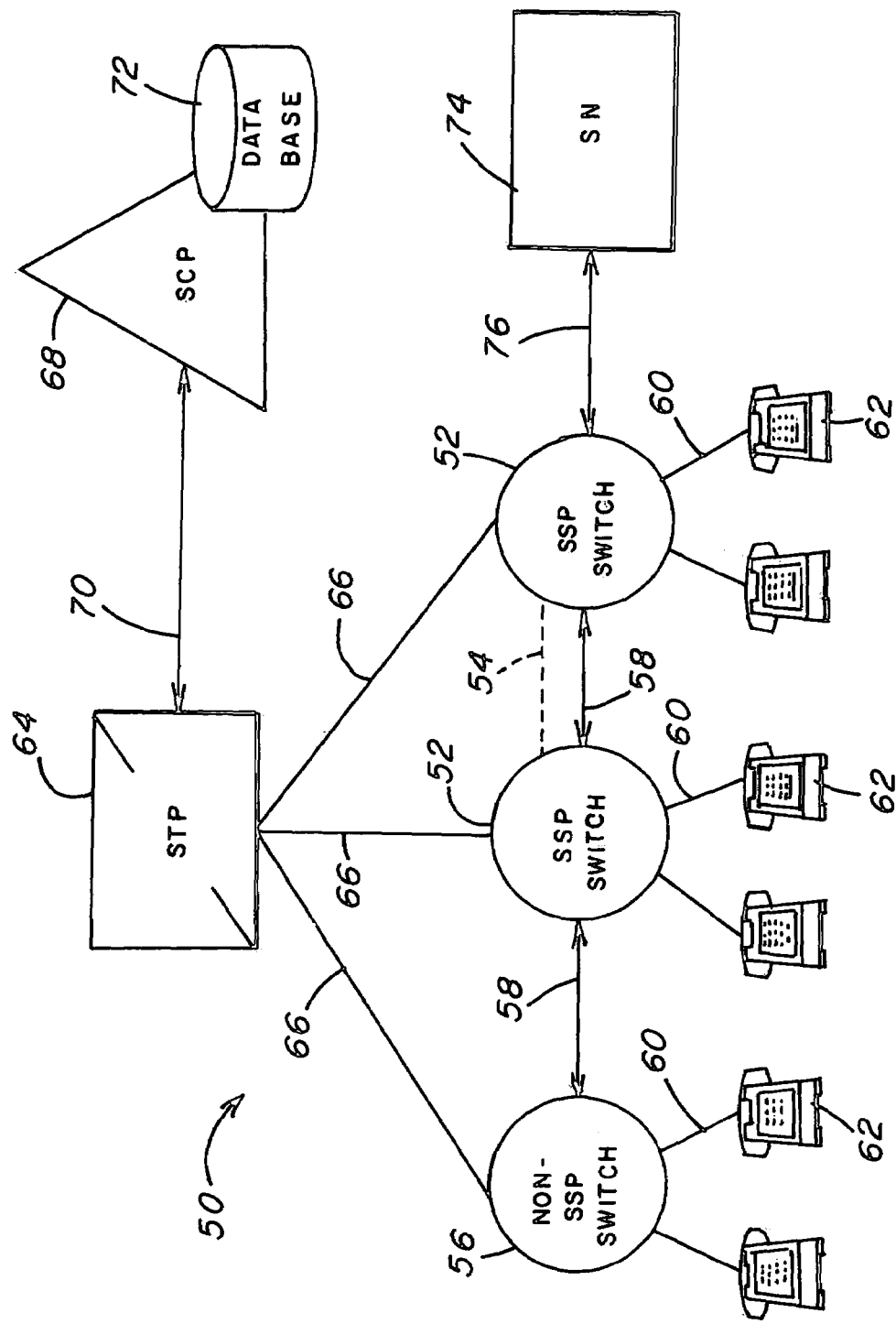
FIG. 2 is a diagram illustrating a portion of a telecommunications system, including an Advanced Intelligent Network (AIN) for integration with the public switched telephone network (PSTN), according to one embodiment of the present invention.

FIG. 2 is a block diagram of an Advanced Intelligent Network (AIN) 50 for integration with the public switched telephone network (PSTN). The AIN 50 may be employed by a LEC, and may be utilized by the LEC to allow the LEC to provide call processing features and services that are not embedded within conventional switching circuits of the PSTN. The AIN 50 may also be employed by, for example, a CLEC or an ICX.

A typical LEC includes a number of central office (CO) switches for interconnecting customer premises terminating equipment with the PSTN. For an LEC including the AIN 50 as illustrated in FIG. 2, the central office switches may be provided as Service Switching Points (SSP) switches 52. The dashed line 54 between the SSP switches 52 indicates that the number of SSP switches 52 in the AIN 50 may vary depending on the particular requirements of the AIN 50. The AIN 50 may also include a non-SSP switch 56. The difference between the SSP switches 52 and the non-SSP switch 56 is that the SSP switches 52 provide intelligent network functionality. Interconnecting the SSP switches 52 and the non-SSP switch 56 are communication links 58 which may be, for example, trunk circuits.

Each SSP switch 52 and non-SSP switch 56 has a number of subscriber lines 60 connected thereto. The subscriber lines 60 may be, for example, conventional twisted pair loop circuits connected between the switches 52, 56 and the telephone drops for the customer premises, or the subscriber lines 60 may be trunk circuits, such as T-1 trunk circuits. The number of subscriber lines 60 connected to each switch 52, 56 may be on the order of ten thousand to one hundred thousand lines. Each of the subscriber lines 60 is connected to a terminating piece of customer premises equipment, represented in FIG. 1 by the landline telephones 62. Alternatively, the terminating equipment may be other types of telecommunications units such as, for example, a telecopier, a personal computer, a modem, or a private branch exchange (PBX) switching system.

For the AIN 50 illustrated in FIG. 2, each SSP switch 52 and the non-SSP switch 56 are connected to a signal transfer point (STP) 64 via a communication link 66. The communication link 66 may employ, for example, the SS7 switching protocol. The STP 64 may be a multi-port high speed packet switch that is programmed to respond to the routing information in the appropriate layer of the switching protocol, and route the data packets to their intended destination.

One of the intended destinations of the data packets from the STP 64 is a service control point (SCP) 68. The STP 64 is in communication with the SCP 68 via a communication link 70, which may also employ the SS7 switching protocol. The SCP 68 may be an intelligent database server such as, for example, an Intelligent Network Service Control Point available from Lucent Technologies Inc., Murray Hill, N.J., and may have associated with it a network database 32 for storing network data. The intelligent functionality of the SCP 68 may be realized by application programs, such as programmable Service Program Applications (SPA), which are run by the SCP 68. The SCP 68 may be employed to implement high volume routing services, such as call forwarding and number portability translation and routing. In addition, another of the functions of the SCP 68 is hosting of the network database 72, which may store subscriber information, such as subscriber call management profiles, used in providing enhanced calling services.

The AIN 50 illustrated in FIG. 2 also includes an intelligent services node (SN) 74. The SN 74 may be, for example, a Compact Services Node (CSN) available from Lucent Technologies Inc., Murray Hill, N.J., although the SN 74 may be any other type of available AIN-compliant SN. The SN 74 may be connected to one or more of the SSP switches 52 via a communications link 76 which may be, for example, an Integrated Service Digital Network (ISDN), including BRI (Basic Rate Interface) or PRI (Primary Rate Interface) lines. According to other embodiments, the communications link 76 may be, for example, a T-1 trunk circuit.

The SN 74 may include an enunciator and may be used when some enhanced feature or service is needed that requires an audio connection to the call such as, for example, collect call information. Similar to the SCP 68, the intelligent functionality of the SN 74 may be realized by programmable applications executable by the SN 74.

In order to keep the processing of data and calls as simple as possible at the switches, such as at the SSP switches 52, a set of triggers may be defined at the SSP switches 52 for each call. A trigger in an AIN is an event associated with a particular subscriber line 60 that generates a data packet to be sent from the SSP switch 52 servicing the particular subscriber line 60 to the SCP 68 via the STP 64. The triggers may be originating triggers for calls originating from the subscriber premises or terminating triggers for calls terminating at the subscriber premises. A trigger causes a message in the form of a query to be sent from the SSP switch 52 to the SCP 68.

The SCP 68 in turn interrogates the database 72 to determine whether some customized call feature or enhanced service should be implemented for the particular call, or whether conventional dial-up telephone service should be provided. The results of the database inquiry are sent back from the SCP 68 to the SSP switch 52 via the STP 64. The return packet includes instructions to the SSP switch 52 as to how to process the call. The instructions may be to take some special action as a result of a customized calling service or enhanced feature. For example, for an enhanced calling feature requiring the capabilities of the SN 74, the return message from the SCP 68 may include instructions for the SSP switch 52 to route the call to the SN 74. In addition, the return message from the SCP 68 may simply be an indication that there is no entry in the database 72 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 50 illustrated in FIG. 2 includes only one STP 64, one SCP 68, one network database 72, and one SN 74, although the AIN 50 may further include an additional number of these components as well as other network components which not are included in FIG. 2 for purposes of clarity. For example, the AIN 50 may additionally include redundant SCPs and STPs to take over if the STP 64 or the SCP 68 should fail. In addition, the AIN 50 may include an Automatic Electronic Switching System (AESS) Network Access Point (NAP) in communication with the STP 64, which may be programmed to detect the trigger conditions. Further, the AIN 50 may include regional STPs and regional SCPs in communication with, for example, the local STP 74, for routing and servicing calls between, for example, different LECs.

In operation, the AIN 50 may be used to process collect calls. A user of one of the devices 62 may desire to place a collect call to another of the devices 62 or a device that is located remotely of the entity to which the AIN 50 belongs. The user of such a calling device 62 may dial, for example, a toll-free telephone number or a telephone number preceded by a "0". In either case, the AIN 50 may be configured to place the collect call based on a calling card that is possessed by the user of the calling device 62 and/or the AIN 50 may be configured to place the collect call in a conventional manner. In either case, the AIN 50 will provide information to the called party as described below.

After the user of the calling device 62 dials the number, the call is routed to the appropriate switch 52, whether the switch 52 is configured as a local or toll switch, whichever the case may be. The switch 52 then launches a query to a collect call application or a calling card application in the SCP 68. In the case of a calling card call, an announcement is made to the calling party to request the card number and personal identification number. After the information is entered by the calling party and validated and it is determined that the calling party wishes to place a collect call, an announcement is made for the calling party to enter the telephone number of the called party.

After the calling party enters the telephone number of a called party in the case of a calling card call or upon initiation of the call if the calling party dialed a conventional collect call, the SCP 68 instructs the switch 52 to route the call to the called party. The call is then handled as a conventional collect call except that, if the called party desires to hear rates, terms, or conditions of service of the collect call, the SCP 68 retrieves such information from, for example, the database 72 and the same is routed by the switch 52 to the called party. In the embodiment shown in FIG. 2, information may be conveyed to the calling or called parties via, for example, annunciation by the SN 74 in a conventional manner.

Figure 3:
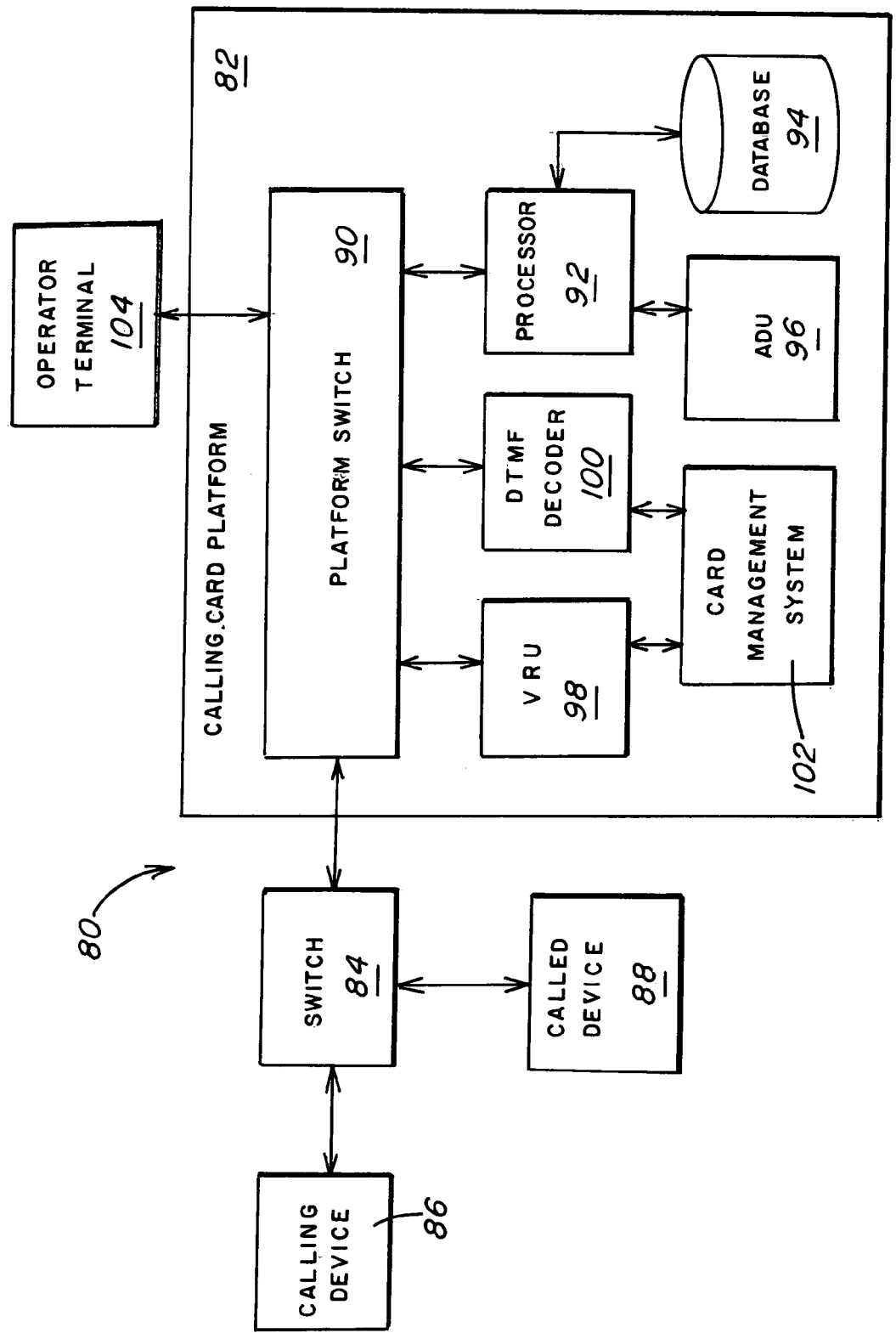
FIG. 3 is a diagram illustrating a portion of a telecommunications system, including a calling card platform, according to one embodiment of the present invention.

FIG. 3 is a diagram illustrating a portion of a telecommunications system 80, including a calling card platform 82, according to one embodiment of the present invention. The calling card platform 82 is in communication with a switch 84. The switch 84 may be any type of switch that is located in, for example, a telecommunications network operated by a LEC, CLEC, or ICX. It can also be understood that, although one switch 84 is illustrated, the system 80 may include any number of switches, both local and toll. A calling telecommunications device 86 and a called telecommunications device 88 are in communication with the switch 84 via, for example, conventional twisted pair loop circuits connected between the switch 84 and the telephone drops for the customer premises, or via, for example, trunk circuits, such as T-1 trunk circuits.

The platform 82 includes a platform switch 90 that handles calls between the platform 82 and the switch 84. The platform switch 90 may be in communication with the switch 84 via, for example, analog lines, ISDN lines, or T-1 trunk circuits. It can be understood that additional elements of the PSTN may be present between the platform 82 and the switch 84, although such elements are not illustrated in FIG. 3 for clarity. The platform switch 90 is controlled by a processor 92. The processor 92 is in communication with a database 94. The database 94 may include, for example, information needed for processing a collect call such as, for example, rates, terms, and conditions of service associated with the call.

An automatic dialing unit (ADU) 96 in the platform 82 dials any telephone numbers that need to be dialed during call processing. For example, the ADU 96 may dial the telephone number of the called party upon initiation of a collect call by the calling party. The platform includes a voice response unit (VRU) 98 that interacts with the calling party and the called party during, for example, validation of the calling party's calling card information and during initiation and setup of a collect call. The VRU 98 may operate similarly to the VRU 24 of FIG. 1. The platform 82 also includes a DTMF decoder 100 that can recognize, for example, tones input by a touch-tone keypad of the calling device 86 and/or the called device 88.

The platform 82 includes a card management system 102 that manages the validation and record-keeping functions associated with each calling card subscriber to the calling card system or network to which the platform 82 belongs.

The system 102 may include, for example, a database (not shown) that contains information, such as a remaining balance left on each calling card, relating to each calling card subscriber.

An operator terminal 104 is in communication with the platform 82. The terminal 104 is used when operator assistance is required to handle a call. For example, a human operator may handle some or all of the functions, such as providing rates, terms, and conditions of service to the called party during a collect call. It can be understood that the terminal 104 may be connected via, for example, an operator access facility. It can also be understood that more than one terminal 104 may be in communication with the platform 82.

It can be understood that the platform 82 may be located remote from, or may be integrated with, the switch 84. Also, more than one platform 82 may be incorporated into a calling card processing system.

In operation, the platform 82 may be used to process collect calls. A user of the calling device 86 may desire to place a collect call to the called device 88. The user of the calling device 86 may dial, for example, a toll-free telephone number located on a calling card.

After the user of the calling device 86 dials the number, the call is routed by the switch 84 to the platform 82. An announcement is made by the VRU 98 to the calling party to request the card number and personal identification number associated with the calling card. After the information is entered by the calling party (e.g. by speaking the information or by entering the information via a touch-tone keypad on the device 86) and validated and it is determined that the calling party wishes to place a collect call, an announcement is made for the calling party to enter the telephone number of the called party.

After the calling party enters the telephone number of called party, the call is dialed by the ADU 96. The call is then handled as a conventional collect call except that, if the called party desires to hear rates, terms, or conditions of service of the collect call, the processor 92 retrieves such information from, for example, the database 94 and the same is annunciated to the called party by the VRU 98.

Figure 4:
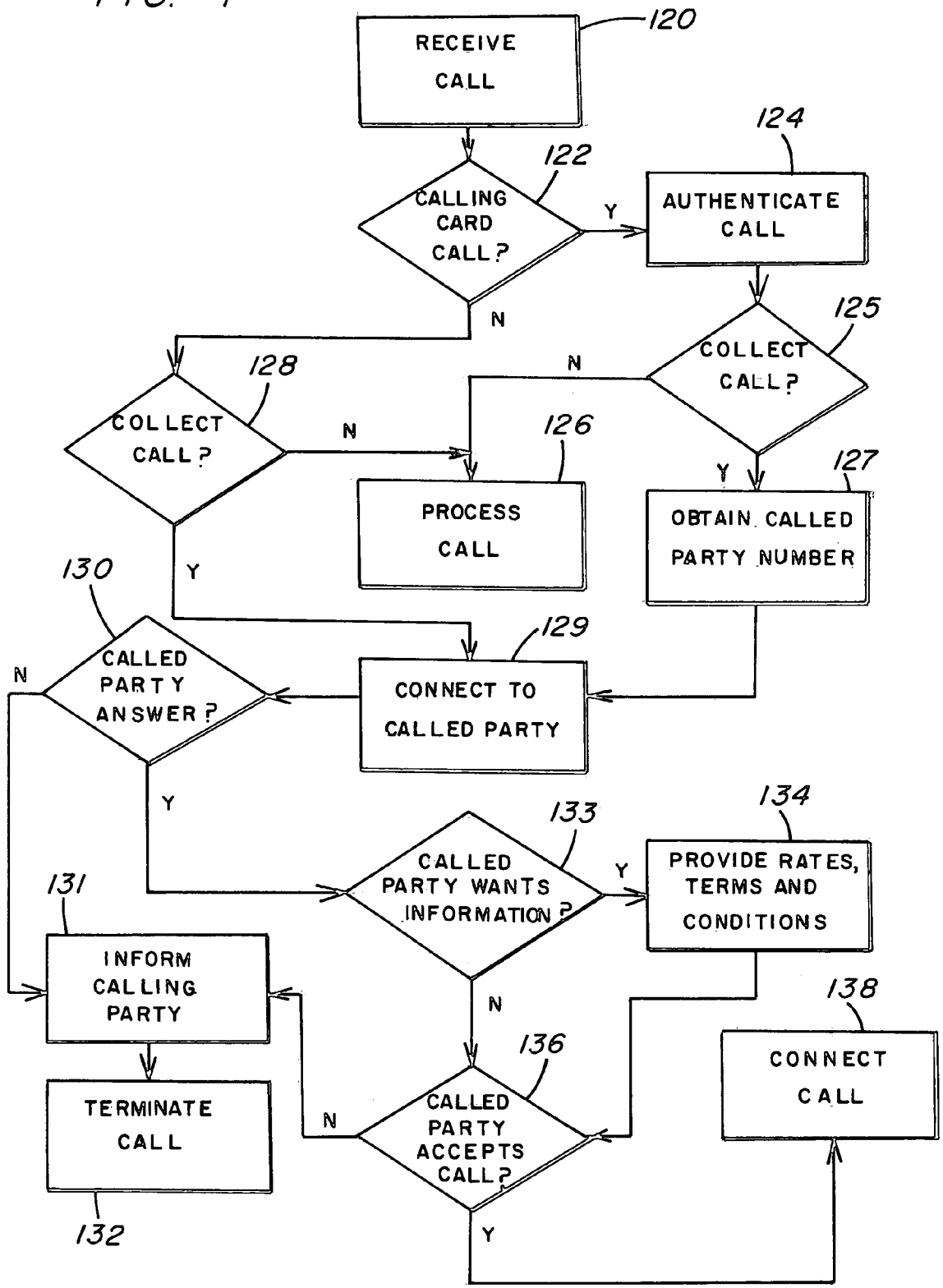
FIG. 4 is a flow diagram illustrating a process of processing a collect call according to one embodiment of the present invention.

FIG. 4 is a flow diagram illustrating a process of processing a collect call according to one embodiment of the present invention. The process may be performed by, for example, the switch 12 of FIG. 1, the AIN 50 of FIG. 2, or the calling card platform 82 of FIG. 3. At step 120, the appropriate device receives a call from a calling party. At step 122, the process determines whether the call is a calling card call. If the call is a calling card call, the calling card details such as account number and PIN, are authenticated at step 124. At step 125, the process determines whether, based on input by the calling party, the call is a collect call. If the call is not a collect call, the call is processed as a conventional call at step 126. If the call is a collect call, the process obtains the telephone number of the called party at step 127.

If the call was not initiated as a calling card call as determined at step 122, the process determines at step 128 whether the call is a collect call by determining, for example, if the dialed number was proceeded by a "0". If the call is not a collect call, the call is processed as a conventional call at step 126. If the call is a collect call, the process proceeds to step 129, where a connection is made to the called party.

At step 130, it is determined if the called party answered the call. If the called party did not answer the call, the calling party is informed of such at step 131 and the call is terminated at step 132. If the called party answered the call, the process determines if the called party wants information, such as rates, terms, and conditions of service, relating to the call at step 133. If the called party desires such information, the information is provided at step 134. The process then advances to step 136, where the process determines whether the called party will accept the call. If the called party accepts the call, the calling party and the called party are connected at step 138. If the called party does not accept the call, the calling party is informed of such at step 131 and the call is terminated at step 132.

It can be understood that the information that is provided to a called party prior to connecting a collect call between a calling party and the called party may be the same information, or a subset of the same information, that telecommunications providers must post on an Internet web page and at a specific place of business pursuant to a detariffing order. Although the phrase "rates, terms, and conditions of service" is used herein, it can be understood that any type of information may be relayed to the called party using the systems and methods described herein. According to one embodiment, when information is presented to the called party and the called party assents to the information and the connection of the call, a contractual relationship is formed between the called party and the entity that presents the information to the called party. Thus, such entity could expect to receive payment for the call and could also expect to receive, for example, late payment fees for late payments if the presented information stated that such late fees would be due upon late payments.

According to one embodiment of the present invention, the switch 12, the AIN 50, or the calling card platform 82 may determine whether the called party is a customer or a subscriber of the entity to which the switch 12, the AIN 50, or the platform 82 belongs. If so, then the collect call is processed in a conventional fashion and the called party is not given the option to hear additional rates, terms, conditions of service, etc.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method of processing a collect call to a called party, comprising:
   receiving a request for a collect call from a calling party at a collect call processing system of a service provider, wherein the calling party utilizes at least one of a facsimile machine, an answering machine and a modem to make calls;
   determining that the called party is not a customer of the service provider, wherein the called party utilizes a personal computing device to receive calls; and
   transmitting at least one of a term of service and a condition of service to the called party, wherein the term of service and condition of service are resident on a website in communication with the collect call processing system of a service provider.

2. The method of claim 1, further comprising connecting the collect call between the calling party and the called party.

3. The method of claim 1, further comprising determining whether the called party has accepted the collect call.

4. The method of claim 1, wherein the at least one of a term of service and a condition of service are related to information that is required pursuant to a detariffing order.

5. A method of processing a collect call, comprising:
   receiving a request for a collect call to a called party from a calling party at a collect call processing system of a service provider;
   determining whether the called party is a customer of the service provider; and
   when the called party is determined to not be a customer of the service provider, then transmitting information required pursuant to a detariffing order to the called party wherein the information is resident on a website in communication with the collect call processing system of a service provider.

6. The method of claim 5, further comprising connecting the collect call between the calling party and the called party.

7. The method of claim 5, further comprising determining whether the called party has accepted the collect call.

8. A method of processing a collect call, comprising:
   receiving a request for a collect call to a called party from a calling party at a collect call processing system of a service provider;
   determining whether the called party is a customer of the service provider;
   when the called party is determined to not be a customer of the service provider, then transmitting, by the service provider, information to the called party; and
   receiving an acceptance of an adequacy of the information from the called party, wherein the acceptance creates a contractual relationship between the called party and the service provider wherein the information comprises a term of service and condition of service and are resident on a website in communication with the collect call processing system of a service provider.

9. The method of claim 8, further comprising connecting the collect call between the calling party and the called party.

10. The method of claim 8, wherein the information is related to information that is required pursuant to a detariffing order.

11. A telecommunications switch that is configured to process a collect call placed by a calling party to a called party, comprising:
    a switch fabric of a service provider in communication with a web server upon which a webpage exists pursuant to a detariffing order;
    a processor of the service provider that is in communication with the switch fabric and that determines whether the called party is a customer of the service provider; and
    a voice response unit in communication with the switch fabric and the processor, wherein the processor and the voice response unit are configured to provide collect call information existent in the web page required pursuant to the detariffing order to the called party when it is determined that the called party is not a customer of the service provider.

12. The switch of claim 11, further comprising a database in communication with the switch fabric and the processor.

13. The switch of claim 11, further comprising a dual tone multi-frequency decoder in communication with the switch fabric and the processor.

14. The switch of claim 11, wherein the information includes at least one of a term of service and a condition of service relating to the collect call.

15. An advanced intelligent network configured to process a collect call placed by a calling party to a called party comprising:

a web server upon which a webpage has been made available pursuant to a detariffing order containing collect call information;
a switch of a service provider in communication with the web server;
a service control point of the service provider that is in communication with the switch and that determines whether the called party is a customer of the service provider; and
a services node of the service provider that is in communication with the switch, wherein the service control point and the services node are configured to provide the collect call information required pursuant to a detariffing order to the called party when it is determined that the called party is not a customer of the service provider.

16. The advanced intelligent network of claim 15, wherein the information includes at least one of a term of service and a condition of service relating to the collect call.

17. The advanced intelligent network of claim 15, further comprising a database in communication with the service control point.

18. A calling card platform configured to process a collect call placed by a calling party to a called party, comprising:
a switch of a service provider;
a web server in communication with the switch;
a voice response unit of the service provider in communication with the switch wherein the voice response unit is configured to process collect call information;
a processor of the service provider that is in communication with the switch and that determines whether the called party is a customer of the service provider, wherein the voice response unit and the processor are configured to provide collect call information required pursuant to a detariffing order to the called party when the called party is not a customer of the service provider, wherein further the collect call information is existent on a web page executing on the web server.

19. The calling card platform of claim 18, wherein the information includes at least one of a term of service and a condition of service relating to the collect call.

20. The calling card platform of claim 18, further comprising a dual tone multi-frequency decoder in communication with the switch.

21. The calling card platform of claim 18, further comprising an automatic dialing unit in communication with the processor.

22. The calling card platform of claim 18, further comprising a database in communication with the processor.

23. An apparatus for processing a collect call, comprising:
means for receiving a request for a collect call from a calling party;
means for displaying information on a web page required to be posted on a web site and at a specific place of business pursuant to a detariffing order wherein the information comprises at least one of a term of service and a condition of service;
means for determining whether the call is a calling card call; and
means for transmitting at least one of a term of service and a condition of service to a called party at least partially in response to the calling card authorization result, wherein the information is existent on the website.

24. An apparatus for processing a collect call, comprising:
means for receiving a request for a collect call to a called party from a calling party within a service provider network;
means for displaying collect call information on a web page required to be posted on a web site and at a specific place of business of the service provider pursuant to a detariffing order;
means for determining whether the called party is a customer of the service provider; and
means for transmitting the collect call information required pursuant to a detariffing order from the service provider to the called party when the called party is not a customer of the service provider.

25. An apparatus for processing a collect call, comprising:
means for receiving a request for a collect call to a called party from a calling party within a network of a service provider;
means for determining whether called party is a customer of the service provider;
means for transmitting, by a telecommunications entity, collect call information to the called party when the called party is not a customer of the service provider; and
means for receiving an acceptance of an adequacy of the information from the called party, wherein the acceptance creates a contractual relationship between the called party and the service provider wherein the collect call information is resident on a website in communication with the network of a service provider.

26. A computer readable medium having stored thereon instructions which, when executed by a processor, cause the processor to:
receive a request for a collect call to a called party from a calling party within a service provider network;
determine whether the called party is a customer of the service provider; and
when the customer is determined to not be a customer of the service provider, then transmit at least one of a term of service and a condition of service relating to the collect call to the called party wherein the term of service and condition of service are resident on a website in communication with the collect call processing system of a service provider.

27. A computer readable medium having stored thereon instructions which, when executed by a processor, cause the processor to:
receive a request for a collect call to a called party from a calling party within a service provider network;
determine whether called party is a customer of the service provider; and
when it is determined that the called party is not a customer of the service provider, transmit collect call information required pursuant to a detariffing order to a called party wherein the collect call information is resident on a website in communication with the collect call processing system of a service provider.

28. A computer readable medium having stored thereon instructions which, when executed by a processor, cause the processor to:
receive a request for a collect call to a called party from a calling party within a service provider network, wherein the calling party is utilizing at least one of a facsimile machine, an answering machine and a modem to make calls;
determine whether called party is a customer of the service provider, wherein the called party is using a personal computing device to receive calls;

when the called party is not a customer of the service provide, then transmit, by the service provider, collect call information to the called party wherein the collect call information includes at least a term of service and condition of service and is resident on a website in communication within the service provider network; and receive an acceptance of an adequacy of the information from the called party, wherein the acceptance creates a contractual relationship between the called party and the telecommunications entity.

* * * * *